US006668374B1

(12) United States Patent
Sten et al.

(10) Patent No.: US 6,668,374 B1
(45) Date of Patent: Dec. 23, 2003

(54) METHOD AND APPARATUS FOR UPGRADING FIRMWARE IN AN EMBEDDED SYSTEM

(75) Inventors: Per Sten, Lund (SE); Mikael Starvik, Malmo (SE)

(73) Assignee: Axis AB, Lund (SE)

( * ) Notice: Subject to any disclaimer, the term of this patent is extended or adjusted under 35 U.S.C. 154(b) by 408 days.

(21) Appl. No.: 09/608,358

(22) Filed: Jun. 29, 2000

Related U.S. Application Data

(60) Provisional application No. 60/165,237, filed on Nov. 11, 1999.

(30) Foreign Application Priority Data

Jul. 8, 1999 (SE) ................................................ 9902644

(51) Int. Cl.$^7$ ................................................ G06F 9/44
(52) U.S. Cl. ........................................ 717/173; 717/178
(58) Field of Search ........................ 717/168–178, 717/167, 120; 707/10; 711/100–104; 713/100, 2

(56) References Cited

U.S. PATENT DOCUMENTS

| 4,982,430 A | | 1/1991 | Frezza et al. | |
|---|---|---|---|---|
| 5,452,454 A | | 9/1995 | Basu | |
| 5,802,544 A | * | 9/1998 | Combs et al. ............... | 717/173 |
| 5,812,857 A | * | 9/1998 | Nelson et al. ................. | 709/1 |
| 5,925,140 A | * | 7/1999 | Hudson ....................... | 370/360 |
| 5,961,582 A | * | 10/1999 | Gaines ........................ | 709/234 |
| 6,178,168 B1 | * | 1/2001 | Andersson et al. ......... | 375/222 |
| 6,298,386 B1 | * | 10/2001 | Vahalia et al. ............... | 709/230 |
| 6,341,143 B1 | * | 1/2002 | Nelson et al. ............... | 709/230 |
| 6,425,013 B1 | * | 7/2002 | Schmidt et al. ............. | 709/230 |

FOREIGN PATENT DOCUMENTS

| EP | 0601704 A1 | | 6/1994 | |
|---|---|---|---|---|
| WO | WO 00/17749 | * | 3/2000 | ........... G06F/9/445 |

* cited by examiner

Primary Examiner—Kakali Chaki
Assistant Examiner—Lawrence Shrader
(74) Attorney, Agent, or Firm—IP Creators; Charles C. Cary

(57) ABSTRACT

A method for upgrading firmware in an embedded system and an embedded system (110) provided with means for upgrading firmware received over a network (30) are disclosed. The method for upgrading firmware is performed from a client computer (10) to the embedded system (110) via a network connection by letting a virtual file system (122) of the embedded system (110) being shared with a client computer (10).

The embedded system (110) is provided with means for upgrading firmware received over a network (30), and comprises a volatile memory (150), a persistent memory (160), a protocol stack (180) for communication over a network (30). Further it comprises a virtual file system (122), which is shareable with an operating system of a client computer (10) via the network (30), and a control means (128) for controlling a file intended for the virtual file system. Further the control means (128) comprises means for checking the characteristics of the file, and means for storing a file in the volatile memory.

15 Claims, 4 Drawing Sheets

METHOD AND APPARATUS FOR UPGRADING FIRMWARE IN AN EMBEDDED SYSTEM

This application claims the benefit of provisional application No. 60/165,237 filed Nov. 11, 1999.

TECHNICAL FIELD OF THE INVENTION

The present invention relates to a method for upgrading firmware of an embedded system via a network connection. Further, the present invention relates to an embedded system provided with means for upgrading firmware received over a network, comprising; a volatile memory, a persistent memory, and a protocol stack for communication over a network.

BACKGROUND OF THE INVENTION

The technology of data communication develops fast and the computer networks are expanding and consist of an increasing number of clients and servers.

Users and owners of networks require that servers and the embedded systems thereof are up to date in accordance with the rapidly changing data communication technology. Further, an increasing part of the development of embedded systems is today performed as development of firmware. Because of the rapid development of data communication technologies and requirements of new functionality from users the firmware of an embedded system has to be upgraded frequently.

Further, the use of computer networks is increasing, and today almost every company has a computer network of their own, or is at least connected to one. The increasing number of computer network results in an increasing number of individuals responsible for the daily maintenance of networks. Many of those individuals are not specialised in computers or computer communications.

Thus, the rapid development of computer communication technologies and products, and the increasing number of individuals responsible for the daily maintenance require that the firmware upgrade of the servers can be performed in a way that is easy and secure, in respect of low error probability.

The upgrading of firmware is today commonly managed by connecting a computer direct to the embedded system. Further it is known to perform upgrading of firmware over the network which the server is connected to.

A significant problem in upgrading the firmware of known embedded systems is that the individual performing the upgrade has to have detailed knowledge of the computer network and the embedded system and have to perform a number of rather complicated steps. Most individuals are not confident in performing said steps and are not confident in using all numerals and characteristics required to be input when performing the firmware upgrade. Further, the upgrading requires a specially designed program within the client to download the firmware upgrade to the embedded system. These aspects makes the operation of upgrading firmware of an embedded system difficult and time consuming for an individual, especially if the individual is not specially skilled in the art of computers and computer communications. In the known art an upgrade file is downloaded to the embedded system by means of a file transfer protocol. The download is performed with a special purpose program and the individual performing the download is required to specify, for example, where, in the form of a network address, the data is to be sent.

Another common problem, when upgrading firmware in embedded systems, is the risk of communication failure during the firmware download. Such failure could render the embedded system inoperative, thus requiring considerate efforts to repair.

U.S. Pat. No. 5,812,857 discloses a method for upgrading a download code set, where an embedded system uses the same network drivers as when in normal operation. Further it describes a download where different portions of the code set are downloaded during different steps of the downloading operation. Some portions of the code set are downloaded to a flash memory via a volatile memory while some portions are downloaded directly to the flash memory. There is also described that a temporary downloader, downloaded during an initial step and replaced by yet another downloader during a later step, is used during the operation of download. The described system and method is designed for minimizing the time of executing code out of volatile memory to the persistent memory and is rather complicated.

SUMMARY OF THE INVENTION

The object of the present invention is to provide a new and improved method for upgrading firmware in an embedded system and a new and improved embedded system, in respect of upgrading firmware.

Another object of the invention is to provide a firmware upgrading method that is easy to use and that saves time.

Yet another object of the invention is to provide a firmware upgrading method in which the probability of an erroneous upgrade is minimised.

These objects, as well as other objects that will become apparent from the description below, are accomplished by a method according to claim 1 and 8 and by an embedded system according to claim 19. Preferred embodiments of the invention are disclosed in the dependent claims.

Within the context of the invention the term embedded system denotes a special-purpose computer built into and integral to a server device. Wherein the server device can be, for example, a CD-server, a printer server, a file server, a communication server, etc.

According to the invention, a virtual file system is used in the embedded system. This leads to the advantage that the individual starting the upgrade can be working in a well-known environment and can be able to use the same commands as when handling files within the client computer. Such handling of files within the client system is performed daily by users of computers, thus, the individual is probably familiar with performing such handling and thereby the system according to the invention can be time saving.

Further, by using a virtual file system within an embedded system a simple way of transferring a file from the client computer to the embedded system can be used, e.g. by sharing the virtual file system with the client computer. Sharing a file system shall be interpreted as the file system being arranged in such a way that it can be used within a client computer and be handled as if it was a part of the file system of that client computer.

Yet another advantage of the invention is that the protocol stack of the embedded system can be the same for both the normal operation of the server and the upgrading operation. Thus, it is possible to save space in the persistent memory of the embedded system. It is to be understood that the virtual file system is operating independently of the protocol stack currently in use.

By storing the data of the firmware upgrade file in the volatile memory before writing it to the persistent memory critical data can be checked before it is written to persistent memory. Thus, it is possible to check if the data represents a correct firmware upgrade file and if the data is intended for the product related to the embedded system.

In a preferred embodiment of the invention, the virtual file system of the embedded system is mapped within the client computer. Thereby no specially designed programs have to be used at the client computer. Thus, both time and memory space of the client computer is saved.

According to a specific embodiment of the method of the invention, the entire firmware upgrade file is stored in the volatile memory of the embedded system before it is written to the persistent memory. Thereby an error in the firmware upgrade file can be identified, e.g, by letting control means check the file, before the file replaces the firmware currently stored in the persistent memory. Such errors are generally a result of interruptions in network traffic or other network related errors.

BRIEF DESCRIPTION OF THE DRAWINGS

Other features and advantages of the present invention will become apparent from the following detailed description of a presently preferred embodiment, with reference to the accompanying drawings.

DETAILED DESCRIPTION OF A PRESENTLY PREFERRED EMBODIMENT

Figure 1:
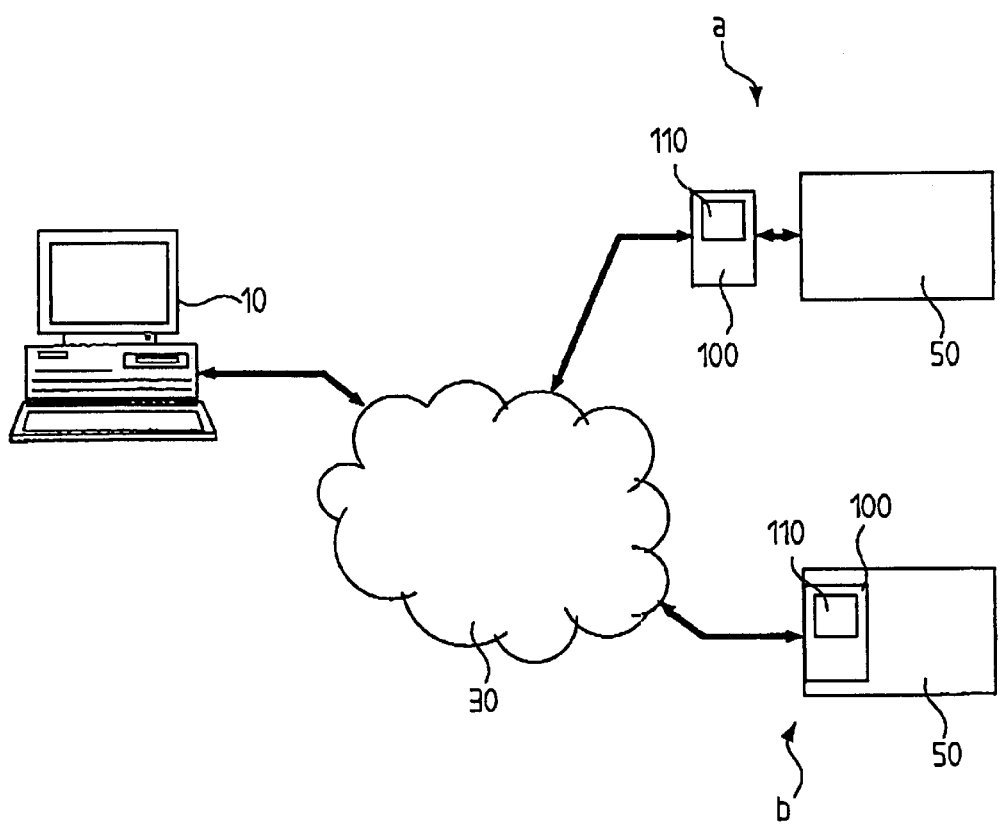
FIG. 1 is a schematic diagram of an environment of the embedded system of the invention.

Referring to FIG. 1, an environment of the invention is shown where a client computer 10 and servers 100 are connected to a network 30. The servers 100 each provide a device 50 with means for communication with the client computer 10 over the network 30. The client computer 10 described herein could be any client computer of a plurality of client computers connected to the network 30. The servers 100 each comprise an embedded system 110 performing the processing of the servers 100. A firmware upgrade is started at the client computer 10 and is directed to one embedded system 110.

A server 100, comprising the embedded system 110, enables devices 50 to be reached or shared via the network. The server 100 could be built in to a device 50, arrangement b, or could be external to a device 50, arrangement a.

A device 50 can be any device that could be interesting to connect to a network. For example, it could be an industrial robot, a control unit or a gauge for a process or a peripheral device, such as a printer, a modem, a scanner, a fax machine, a photocopier or a multifunction peripheral.

Figure 2:
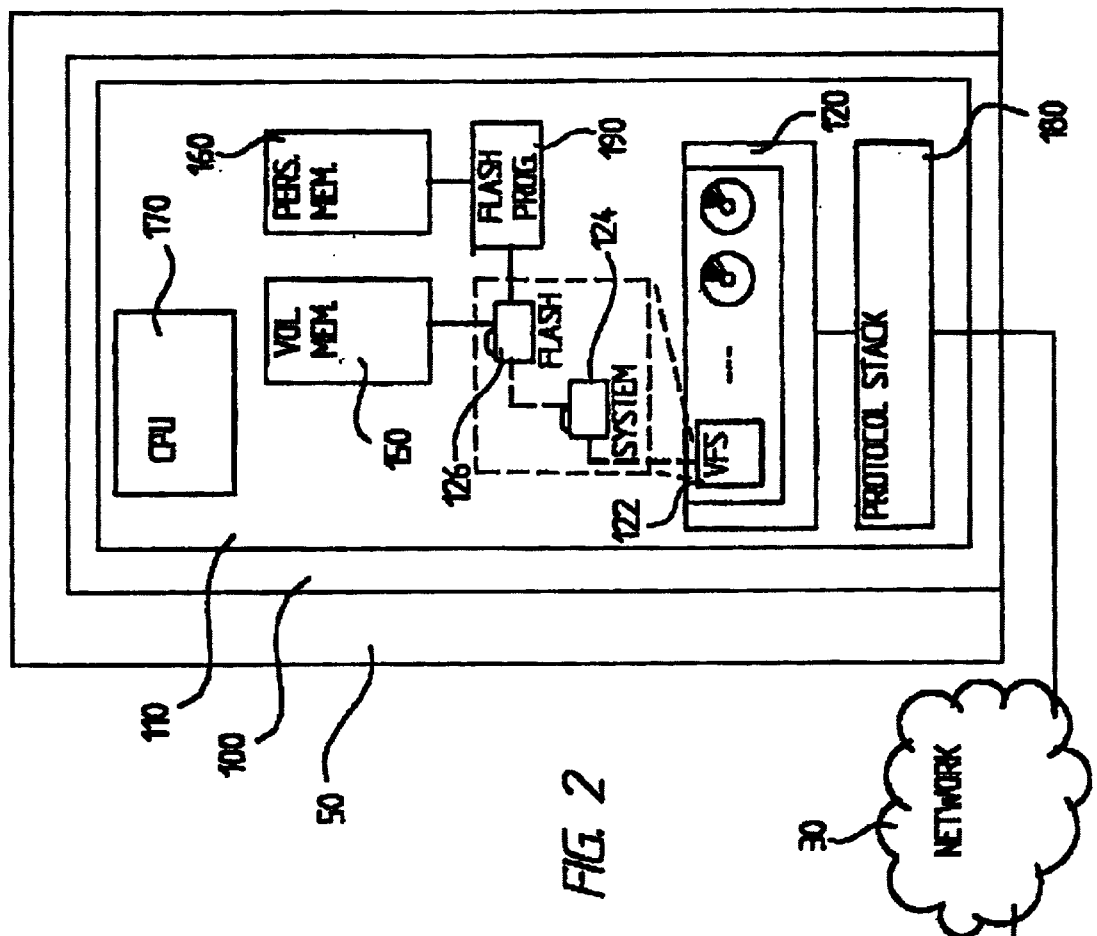
FIG. 2 is a schematic diagram of an embedded system and a client computer during an upgrade of firmware of the embedded system.
Figure 2:
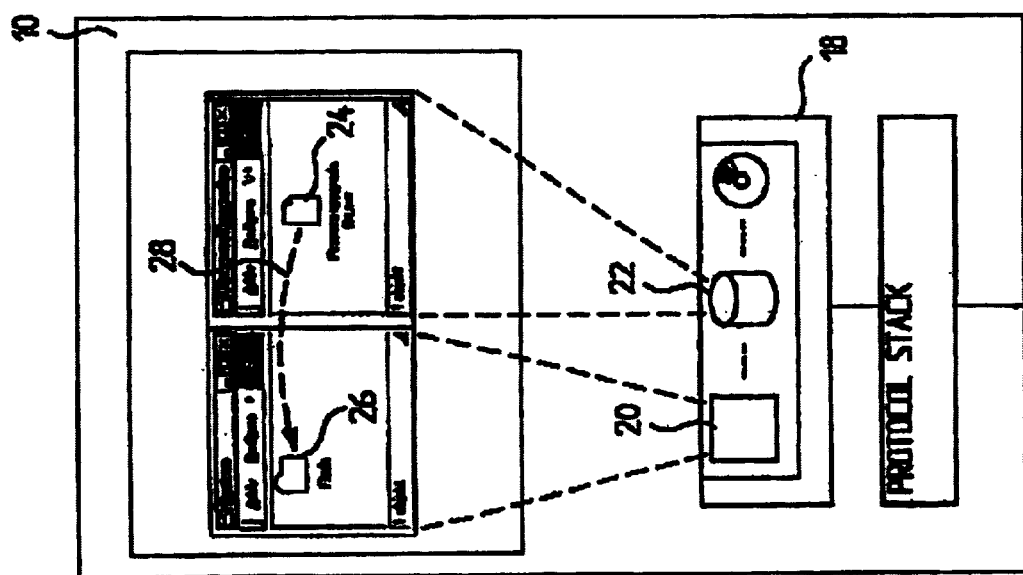

Now referring to FIG. 2, the embedded system 110 of the preferred embodiment comprises a file system 120, a volatile memory 150, a persistent memory 160, a central is processing unit 170 (CPU), at least one protocol stack 180 and a programmer 190.

Within the file system 120 a virtual file system 122 (VFS) is implemented and in the virtual file system a directory for upgrading 126, hereinafter called "FLASH", is provided. In the preferred embodiment of the invention the FLASH directory 126 is a subdirectory to a directory 124 called "SYSTEM", which also comprises other resources.

The volatile memory 150 is a memory that loses the information stored therein when the power to it is switched off and it is used to store temporary data. The persistent memory 160 is a reprogrammable memory where stored data is preserved even when the power to it is switched off. In the preferred embodiment the persistent memory 160 is a flash memory but could be any reprogrammable memory preserving data after the power has been switched of. The CPU 170 is processing the functions, protocols, etc of the embedded system. The protocol stack 180 contains the protocols for communication over the network. The programmer 190, herein after called flash programmer 190, is a means for writing code into the persistent memory 160.

The client computer 10 comprises an operating system having a file system 18 allowing mapping of resources 20 shared over the network 30.

The server 100 related to the device 50 is mapped within the file system of the client computer.

The server 100 is generally mapped in the file system 18 for other purposes than firmware upgrading. If, for example, the device 50 served by the server is a file storage device, the storage area is generally accessible from the client computer by the use of ordinary file handling commands of the operating system of the client computer 10. Thus, there is established a pointer from the file system 18 of the client computer 10 to a root directory of the file system 120 of the embedded system 110 of the server 100. Thereby, the subdirectories of the file system 120 of the embedded system 110 also are available within the file system 18 of the client computer 10. If the server 110 is not already mapped in the file system 18 of the client computer 10 for normal operation of the device 50, then the server 100 has to be mapped at the client computer 10 before performing the upgrading operation according to the invention.

This arrangement results in the directories of the embedded system 110 being possible to handle within the file structure of the operating system of the client computer 10. Further, the directories of the embedded system 110 can be accessed as if they where directories of the client computer 10, using ordinary file handling commands.

Figure 3:
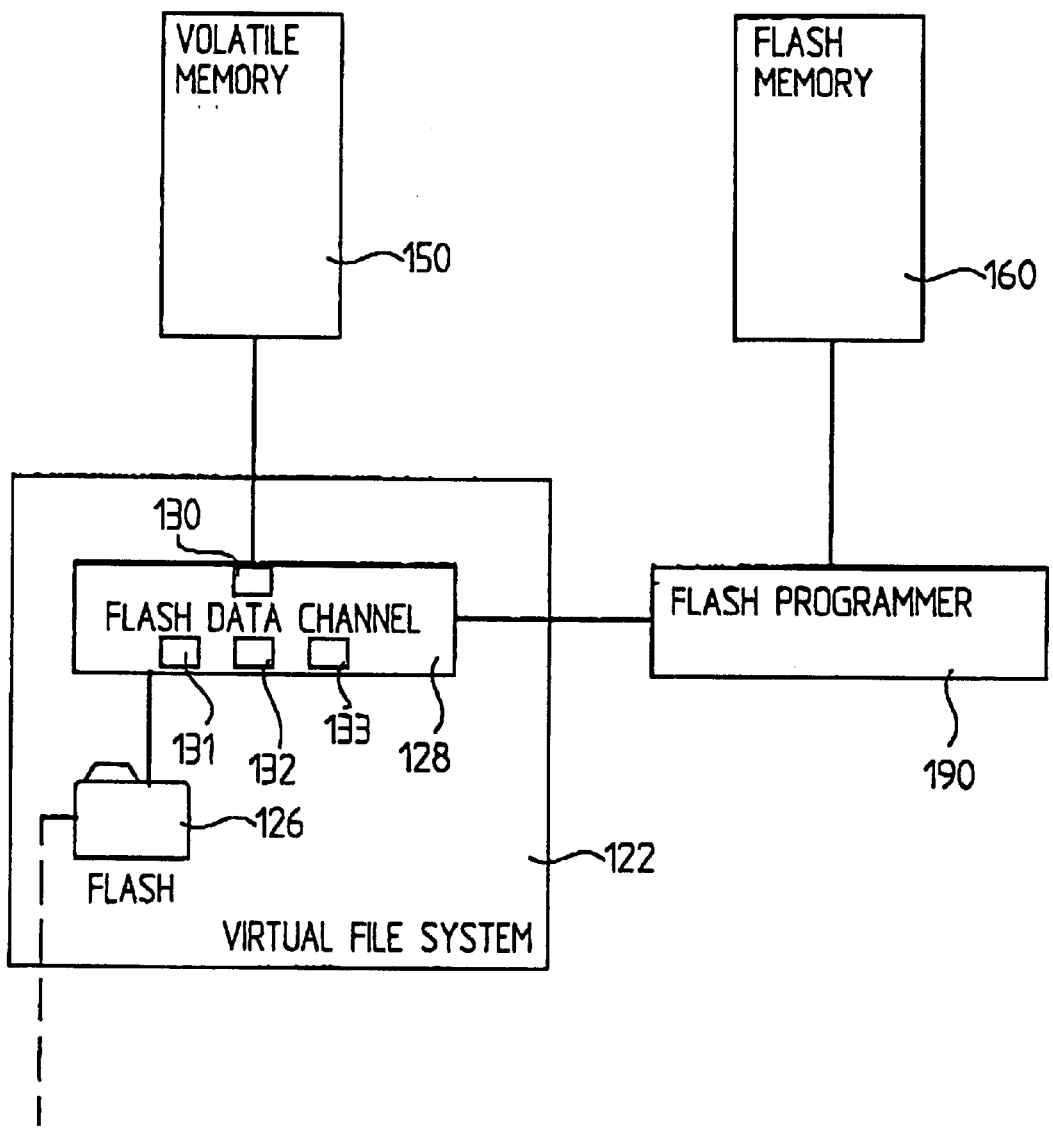
FIG. 3 is a detailed view of a portion of the embedded system shown in FIG. 2

Referring now to FIG. 3, showing the FLASH directory 126 within the virtual file system 122 of the embedded system 110. There is a control means, realised by a data channel 128, associated with the FLASH directory 126. Hereinafter this data channel 128 is referred to as flash data channel 128. The flash data channel 128 is reset every time the FLASH directory 126 is accessed. The flash channel is allocated a portion of the volatile memory 150 for storing data. The flash data channel 128 handles all data sent to the FLASH directory 126 and is specially designed to handle firmware upgrade files and to perform various control operations on the data received.

To perform said control operations the flash data channel 128 comprises means for checking the characteristics of the file, namely first checking means 131, second checking means 132 and third checking means 133, and means 130 for storing data of a file in the volatile memory 150. Said checking and storing means are realised by program code related to the flash data channel 128. The first checking means 131 checks if the file is a firmware upgrade file by checking for a "magic number", described below. The second checking means 132 checks if the file stored in the volatile memory 150 is intended for the product related to the embedded system 110. The third checking means 133 checks the checksum of the file to decide if there are any errors in the file.

Further the flash data channel 128 provides a flash programmer 190 with the approved firmware upgrade files to have the firmware upgrade file written to the persistent memory 160. A more detailed description of the functions of the flash data channel is found below, in the description of the method.

Figure 4:
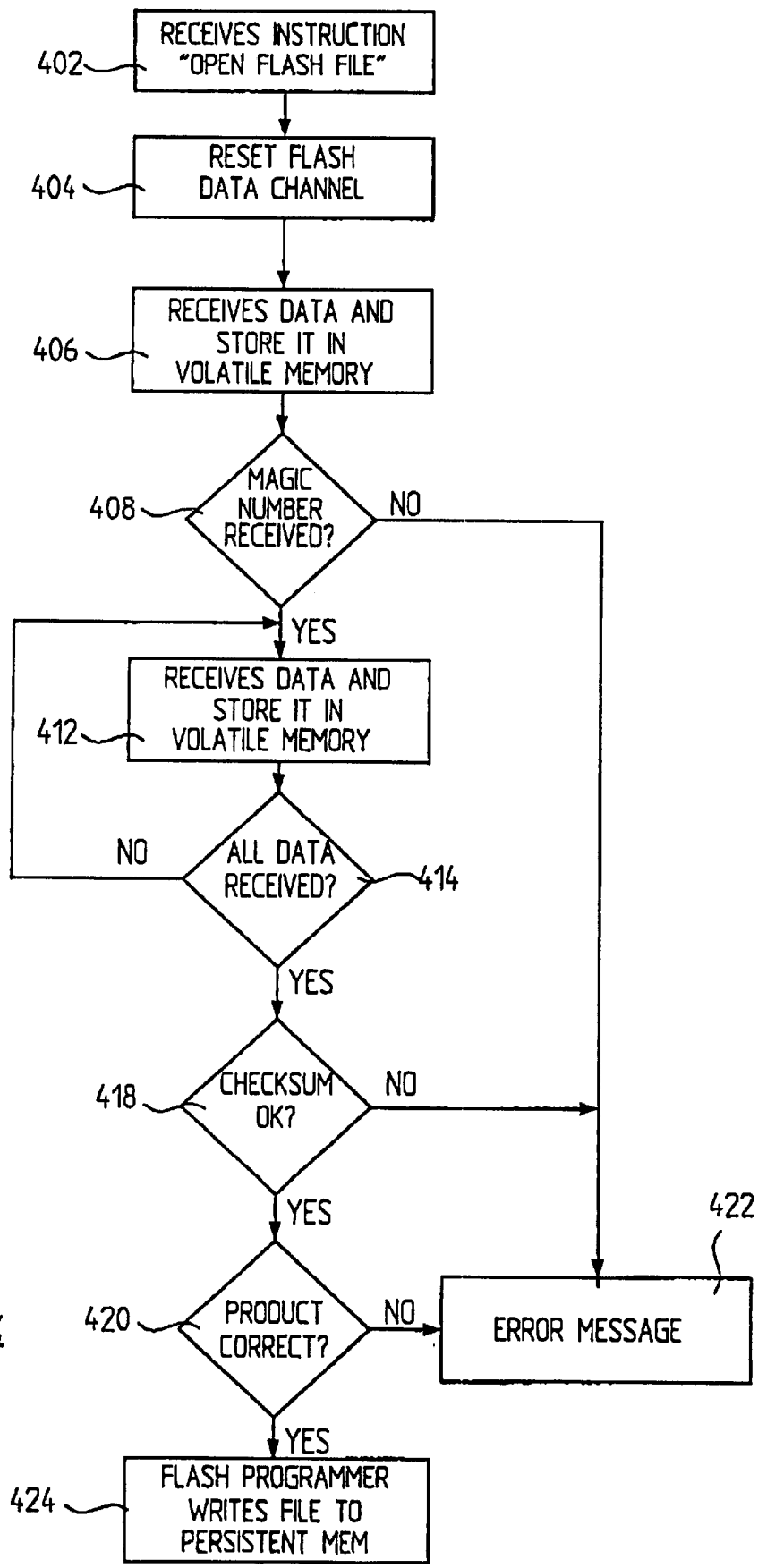
FIG. 4 is a diagram showing events according to the method of the invention.

Now referring to FIGS. 2 and 4, describing the preferred method for upgrading firmware. We presume that the server 100 has been mapped in the file system 18 of the client computer 10.

Let us assume that an user is interested in upgrading the firmware of a server with a firmware upgrade file 24, which he has received from the manufacturer of the server 100 and has stored on the hard disk 22 of the client computer 10. It should be understood that the firmware upgrade file of course could be stored on any storage unit accessible from the client computer 10.

The user then uses the ordinary file handling commands, for the present operating system, to copy or move the firmware upgrade file 24 to the FLASH directory. In the preferred embodiment the individual "drags and drops" 28 the firmware upgrade file 24 to the representation of the FLASH directory 26 within the client computer.

The client computer 10 thereafter sends an instruction to the embedded system telling it to open a flash file, step 402, within the virtual file system 122 of the embedded system.

Thereafter, the flash data channel is reset, step 404, and data of the firmware upgrade file 24 is received and stored, step 406, in the volatile memory 150. The flash data channel controls the data during reception, step 408, checking for an identifier in the form of "a magic number" corresponding to an identifier confirming that the data received belongs to a firmware upgrade file.

The check, in step 408, for a magic number identifying the data as a firmware upgrade file, checks a predefined position in the data file for the "magic number". Preferably the magic number is positioned at the beginning of the firmware upgrade file.

If the magic number corresponding to a firmware upgrade file does not occur at the predefined position in step 408, then the data of the file does not belong to a firmware upgrade file. As a result thereof an error message is sent, step 422, to the client and the file transmission is terminated.

If a magic number corresponding to a firmware upgrade file 24 is received, step 408, then the reception of data continues, steps 412, 414, until all data of the firmware upgrade file is stored in the volatile memory 150.

When all data of a firmware upgrade file has been received the flash data channel controls the checksum, step 418, of the received file. If the checksum is not correct then the received file is corrupt. As a result thereof an error message is sent, step 422, to the client computer and the upgrading operation of the embedded system is terminated.

If the checksum is correct then the flash data channel is checking, step 420, for a product identifier within the file telling what product the firmware upgrade file is intended for. If the identifier does not correspond to the server product then an error message is sent, step 422, to the client computer and the upgrading operation of the embedded system is terminated.

If the product identifier is correct, then the flash programmer 190 is ordered to erase at least a portion of the memory and then write, step 424, the firmware upgrade file in the volatile memory 150 to the flash memory 160. When the firmware upgrade file has been written to the flash memory 160 the flash file is closed, which is indicated at the client computer in a similar way as when an ordinary file transfer has been completed.

What is claimed is:

1. A method for upgrading firmware in an embedded system coupled across a network with client computers, and the method comprising the acts of:

generating on the embedded system and specifically within a file system thereof, a virtual firmware upgrade file directory targeted to a programmable read only memory portion of the embedded system for viewing within a network view on a file system of at least one of the client computers;

requesting a file transfer within the file system of an initiating one of the client computers by coping or moving a firmware upgrade file between a first directory and the virtual firmware upgrade file directory generated by the embedded system in the generating act;

receiving on the embedded system the file transfer request from the initiating one of the client computers; and opening a dedicated firmware upgrade data channel to manage the firmware upgrade of the programmable read only memory portion of the embedded system responsive to the file transfer requested in the requesting act from the initiating one of the client computers.

2. The method of claim 1, further comprising:

validating at least one characteristic of the firmware upgrade file not associated with an integrity of the transfer across the network.

3. The method of claim 2, wherein the validating act further comprises:

checking if the firmware upgrade file corresponds with a product type of the embedded system.

4. The method of claim 2, wherein the validating act further comprises temporarily storing the complete firmware upgrade file; and upgrading the firmware in the embedded system with the firmware upgrade file responsive to a positive validation of the at least characteristic in the validating act.

5. The method of claim 2, further comprising:

sending an error message from the embedded system to the initiating one of the client computers when the file transfer request does not correspond to a valid firmware upgrade file.

6. A method for upgrading firmware in an embedded system configured to couple across a network with client computers, and the method comprising the acts performed on the embedded system of:

generating on the embedded system and specifically within a file system thereof, a virtual firmware upgrade file directory targeted to a programmable read only memory portion of the embedded system for viewing within a network view on a file system of at least one of the client computers;

receiving a file transfer request initiated within a network view on the file system of an initiating one of the client computers and targeted to the virtual firmware upgrade file directory on the embedded system to transfer a firmware upgrade file across the network; and opening a dedicated firmware upgrade data channel to manage the firmware upgrade of the programmable read only memory portion of the embedded system responsive to the transfer request initiated and targeted by an initiating one of the client computers to the virtual firmware upgrade file directory.

7. The method of claim 6, further comprising:

validating at least one characteristic of the firmware upgrade file not associated with an integrity of the transfer across the network.

8. The method of claim 7, wherein the validating act further comprises:

checking if the firmware upgrade file corresponds with a product type of the embedded system.

9. The method of claim 7, wherein the validating act further comprises temporarily storing the complete firmware upgrade file; and upgrading the firmware in the embedded system with the firmware upgrade file responsive to a positive validation of the at least characteristic in the validating act.

10. The method of claim 7, further comprising:

sending an error message from the embedded system to the initiating one of the client computers when the file transfer request does not correspond to a firmware upgrade file.

11. An embedded system configured to couple across a network with client computers, and the embedded system comprising:

a programmable read only memory configured to store firmware for the embedded system;

means for generating on the embedded system and specifically within a file system thereof, a virtual firmware upgrade file directory targeted to the programmable read only memory portion of the embedded system for viewing within a network view on a file system of at least one of the client computers;

means for receiving a file transfer request initiated within a network view on the file system of an initiating one of the client computers and targeted to the virtual firmware upgrade file directory on the embedded system to transfer a firmware upgrade file across the network; and means for opening a dedicated firmware upgrade data channel to manage the firmware upgrade of the programmable read only memory portion of the embedded system responsive to the transfer request initiated and targeted by initiating one of the client computers to the virtual firmware upgrade file directory.

12. The embedded system of claim 11, further comprising:

means for validating at least one characteristic of the firmware upgrade file not associated with an integrity of the transfer across the network.

13. The embedded system of claim 12, wherein the means for validating further comprises:

means for checking if the firmware upgrade file corresponds with a product type of the embedded system.

14. The embedded system of claim 12, further comprising:

means for temporarily storing the complete firmware upgrade file; and means for upgrading the firmware in the embedded system with the firmware upgrade file responsive to a positive validation of the at least characteristic in the validating act.

15. The embedded system of claim 12, means for sending an error message from the embedded system to the initiating one of the client computers when the file transfer request does not correspond to a valid firmware upgrade file.

* * * * *